Patented Dec. 1, 1942

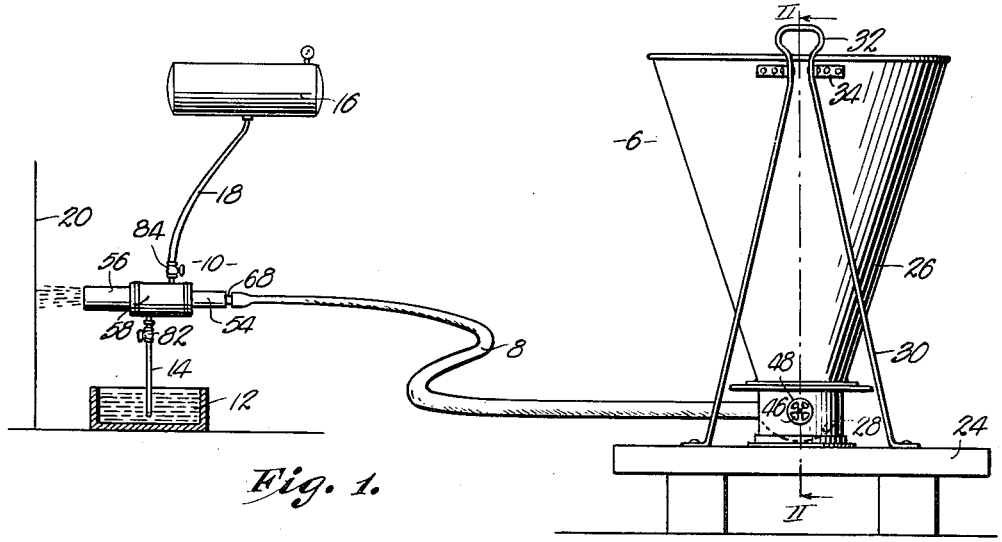
Fig. 1.
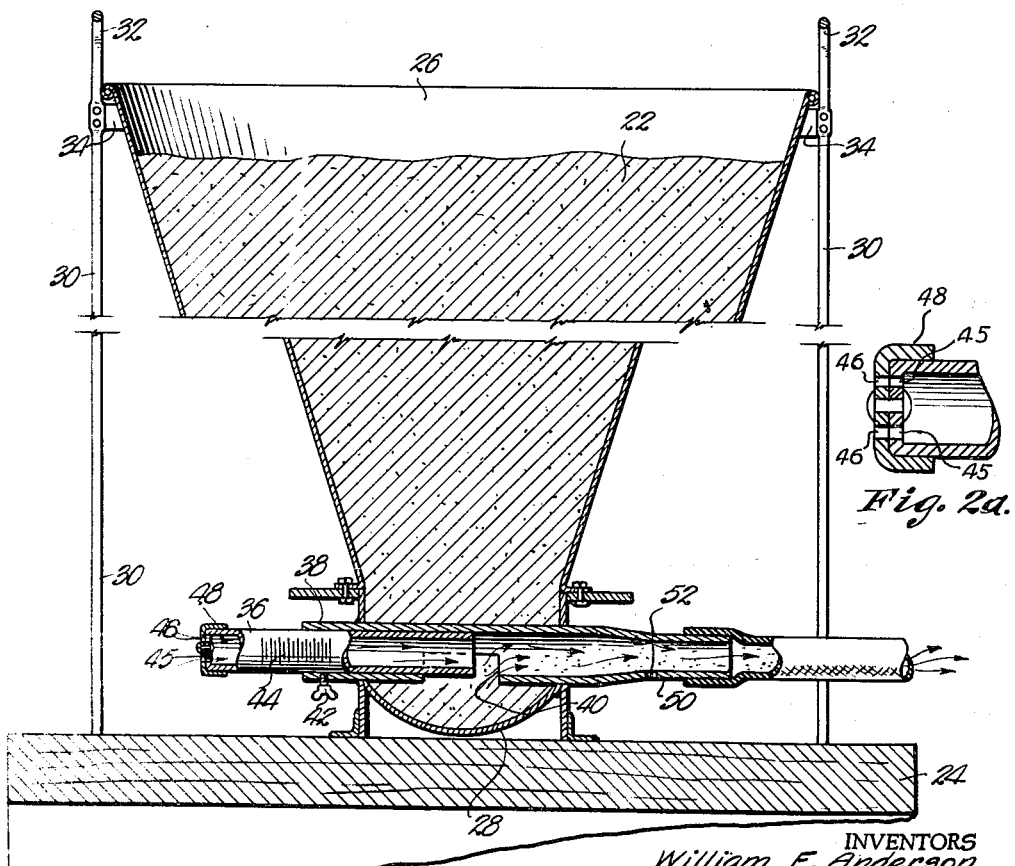
Fig. 2.
Fig. 2a.
INVENTORS
William E. Anderson
Francis C. Downey

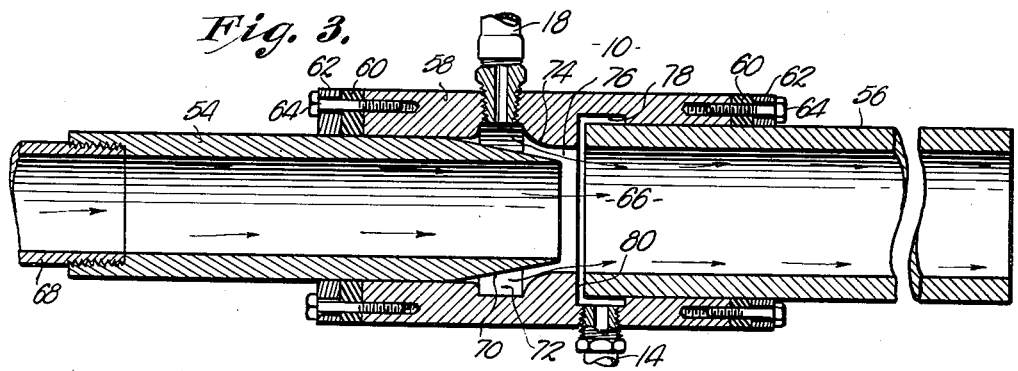
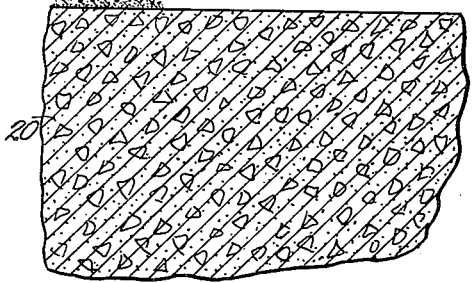
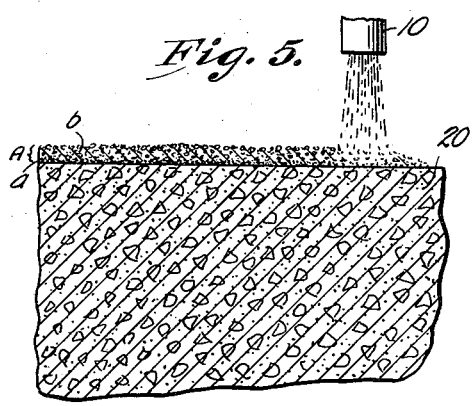
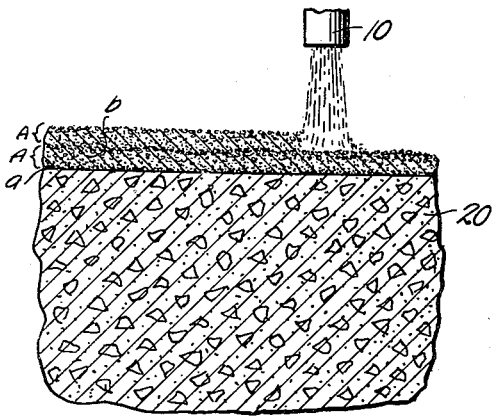
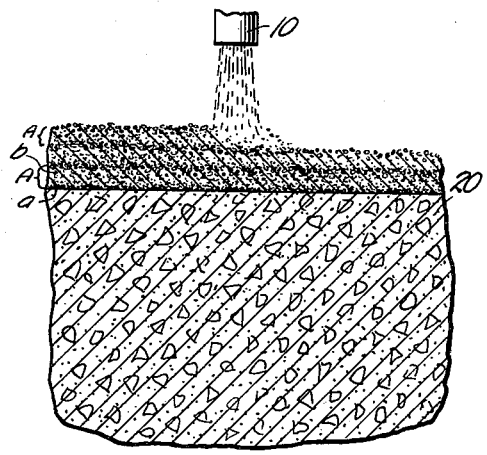

2,303,810

UNITED STATES PATENT OFFICE 2,303,810

APPARATUS FOR DEPOSITING MATERIALS

William E. Anderson and Francis C. Downey, Kansas City, Mo., assignors to Jo Zach Miller, III, trustee, Kansas City, Mo.

Application November 30, 1940, Serial No. 367,978

3 Claims. (Cl. 302—52)

This invention relates to the art of feeding materials and particularly apparatus for emplacing cementitious substances on surfaces, which substances are formed by mixing sand and cement and the like, with water, through the medium of a specially designed nozzle, which nozzle is operably joined to a feeder of unique character.

One of the important aims of the instant invention is the provision of a feeder for apparatus of the aforementioned character, which feeder has an outlet port near the bottom thereof, arranged with respect to a specially contoured inner face on the floor of the feeder to increase the output ability to such an extent that apparatus embodying the broad concepts hereof, is capable of applying properly mixed substances at a relatively high rate of speed.

Other objects of the invention include the unique manner of controlling the size of the aforesaid outlet port; the manner of preventing accidental clogging of the material transporting structure leading from the feeder to the nozzle; the manner in which the air is admitted to the material conveying hose; and the form of the feeder hopper with special regard to the outlet port, the specific details of all of which will appear during the course of the following specification, referring to the accompanying drawings, wherein:

Figure 1 is a diagrammatic side elevational view of apparatus for depositing material having parts made in accordance with the present invention.

Fig. 2 is a vertical condensed central sectional view taken on line II—II of Fig. 1.

Fig. 2a is a fragmentary sectional view on an enlarged scale of a valve controlled air inlet for the feeder hopper.

Fig. 3 is a longitudinal fragmentary condensed central sectional view through the injector of the apparatus; and Figs. 4, 5, 6 and 7 are enlarged, detailed diagrammatic views illustrating steps in the formation of a cementitious coating embodying laminations of different densities.

This application is related to our co-pending cases, Serial Nos. 286,240 filed July 24, 1938, and 338,579 filed June 3, 1940, now patented as No. 2,231,489 and No. 2,264,108 respectively.

Generally speaking, the apparatus includes a feeder, broadly designated by the numeral 6, a flexible hose 8 extending therefrom to a nozzle 10, a source of liquid 12, a tube 14 interconnecting the liquid source 12 with nozzle 10, and a compressed air tank 16 joined to nozzle 10 by tube 18.

In the diagrammatic view, the numeral 20 represents the surface being coated and the material with which water in tank 12 is admixed is designated by the numeral 22. This material is usually sand and cement and the sand always is moist enough to have the grains thereof coated with a covering of cement before the two substances pass into hose 8 from feeder 6 toward nozzle 10.

The feeder is mounted on a platform 24 and includes a hopper 26, the sides of which are downwardly and inwardly disposed to insure an even, constant and uninterrupted flow of material 22 toward the bottom 28, the inner surface of which is preferably concave.

Hopper 26 is secured to platform 24 through the medium of supports 30, the upper ends of which are formed into handles 32. Brackets 34 join supports 30 with the upper portion of hopper 26, as shown in Figs. 1 and 2.

Telescoped inner and outer tubes 36 and 38 respectively, pass diametrically through the lower portion of hopper 26 immediately above the concave bottom 28 thereof. Outer tube 38 has an inlet port 40 formed therethrough on the vertical axis of hopper 26. Port 40 faces downwardly over the lowermost part of bottom 28 in spaced relation thereto, and any materials passing into outer tube 38 will be drawn in the direction of the arrows shown in Fig. 2. Inner tube 36 slidably telescopes with outer tube 38 and is held in a desired position by set-screw 42, the operator readily determining the position of the inner end of inner tube 36 by observing scale 44, etched or otherwise marked on the outer face of inner tube 36.

The outer end of tube 36 is closed by a wall having holes 45 therethrough registrable with holes 46 in revolvable cap 48. Through this arrangement, the amount of air passing into the telescoped tubes 36 and 38 and therefore hose 8, may be controlled.

Flexible hose 8 is joined to tube 38 by a reducer 50, the lower wall of which has a vent 52 therein. As will later be set down, this vent precludes clogging if material 22 drops suddenly into the bottom of hopper 26 and enters inlet port 40 in a manner that might preclude its passage through hose 8.

The nozzle illustrated in detail in Fig. 3 has been found most satisfactory for applying a coating of plastic material without the employment of the usual large amount of water.

The nozzle comprises sections 54 and 56, the ends of which are in opposed spaced apart relation and held in such position by coupling 58, which bridges the space between sections 54 and 56 and is secured thereto through the medium of resilient gaskets 60, which circumscribe sections 54 and 56 respectively. Rings 62 circumscribe sections 54 and 56 and have machine bolts 64 extending therethrough into the ends of coupling 58 so that as said bolts are tightened, the inner annular surfaces of gaskets 60 will be drawn tightly against the respective sections.

Sections 54 and 56 and coupling 48 are cylindrical and the bore 66 through the entire nozzle, comprises the longitudinal bores in sections 54 and 56. Section 56 is relatively short and the free end thereof establishes the end of the nozzle that is usually maintained about 9 in. from surface 20 being coated, as shown in Fig. 1.

One end of section 54 is secured to a coupling 68 extending into one end of hose 8. The end of section 54 adjacent to the inner end of section 56 is reduced to substantially a featheredge by tapering a portion of the length of said section to produce a frusto-conical part, the outer surface 70 of which cooperates with the inner surface of coupling 58 in directing compressed air into bore 66. Tube 18 is joined to coupling 58 and placed into communication with an annular cavity 72 formed in the inner face of the coupling. This cavity 72 circumscribes the inclined face 70 of section 54. A similarly inclined annular surface 74 is formed on coupling 58 to present a continuous annular inclined passage 76 which, when extended, will resolve into a point on the longitudinal axis of bore 66.

When the annular cavity 78, created in coupling 58, circumscribes the inner end of section 56 and annular shoulder 80 is perpendicular to the axis of section and coupling 56 and 58 respectively, the end of section 56 is disposed close to shoulder 80 so that an intake port for liquid, such as water, is established in close proximity to the intake port for air, created by cavity 72 and passage 76. Tube 14 places annular cavity 78 in communication with tank 12 and a valve 82, shown in Fig. 1, is provided to control the passage of water to the nozzle. A similar valve 84 within reach of the operator, controls the passage of air from tank 16 into nozzle 10. An intake port for air is therefore created between the tapered end of section 54, cavity 72 and passage 76. An intake port for water is created by the inner end of section 56, cavity 78 and shoulder 80. These intake ports are continuous and circumscribe the bore 66 in a fashion to cause the air to intersect the path of travel of the water after the air and water are introduced into the nozzle through the intake ports, just defined.

It is important that the air enter bore 18 close to the point of entrance of the water, for the water is thereby atomized and mixed with incoming sand and cement immediately prior to its escape from the nozzle.

The force of the compressed air must be sufficient to draw the material, such as sand and cement, from hopper 26 through port 40 of tube 38. This force must also be sufficient to atomize the water entering the intake port through cavity 78.

Air at approximately 80 lbs. sustained and constant pressure has been found preferable and when section 56 is substantially 6 in. long, the material passing therethrough will assume spiral paths of travel through 2½ turns before reaching the free end of the section. The spiral paths of travel form a vortex about the axis of section 56.

In actual practice, the amount of water per given volume of sand and cement is appreciably less than has been required heretofore. For example, approximately 100 lbs. of sand and cement passing through the nozzle, made as contemplated by this invention, requires but from 2 to 2½ gals. of water, while any other method of hydrating the same amount of sand and cement for application, requires from 4 to 10 gals. of water.

An even flow of air through tube 18 insures an associated even flow of material through bore 66 of the nozzle and surface 20 is therefore evenly coated when the operator manipulates the nozzle through reciprocating paths of travel. The layer of cementitious substance will adhere to surface 20 and be characterized by a denser lamination directly upon the surface. This type of coating is due to the rebounding of the sand grains from surface 20 when the cementitious substance first reaches the surface being covered. The grains of sand strike surface 20 to produce a wet sand blasting effect and to leave directly thereon, only the hydrated cement which was originally the coating over the individual grains of sand and which was a part of the mass passing through nozzle 10.

After the primary layer of relatively dense substantially pure combined cement and fines of the sand have adhered to surface 20, the sand will discontinue its rebounding action and the coating will become less dense by virtue of the grains of sand becoming progressively greater in number as the distance from the surface being treated is increased.

The action just set down is repeated when this apparatus is used for the low amount of water insures relatively quick drying. After layer A is applied, the operator will normally return after a short while, depending upon the size of surface 20, whereupon such layer will be "set" to a sufficient extent to cause a rebounding of the sand grains to again produce a layer B, composed of a relatively dense lamination a and a lamination b of less density. This operation may be repeated as often as the work requires.

It has been discovered through actual commercial application, that the covering for surface 20 may be as thick as or thicker than 8 in., the entire body of which comprises alternate layers, each having a dense lamination a and a less dense lamination b. Through the employment of a method and apparatus as described herein, is such characteristics obtained.

The feeder has its inlet port 28 so disposed as to cause the air to suck sand and cement from the bottom where the weight of the material 22 will not tend to force or pack the same into tube 38. The size of inlet port 28 is readily adjusted by longitudinally moving inner tube 36 as before described.

The success of this apparatus is due not only to the manner of feeding the material, but to the nozzle and the method of forming the cementitious substance immediately prior to its leaving the nozzle 10. The water is added in the nozzle and the dry material is sucked through hose 8 rather than being driven, all to the end that the cement coating of the grains in material 22 is not dislodged and mixing within bore 66 is thoroughly and advantageously accomplished.

Having thus described the invention, what is claimed as new and desired to be secured by Letters Patent is:

1. In apparatus for depositing materials, a feeder comprising a hopper provided with a concave bottom; a tube, having a material inlet port in the side thereof, extending within the hopper adjacent to the bottom thereof; means for admitting air into the tube and directing said air in a path extending across said port, said port being downwardly facing in opposed relation with the concave bottom of the hopper, said means for admitting air comprising a tube slidably mounted within the first mentioned tube for movement across the inlet port to selectively vary the size thereof.

2. In apparatus for depositing materials, a feeder comprising a hopper having a downwardly and inwardly inclined side wall and a concave bottom wall; a pair of telescoped tubes extending transversely through the hopper near the bottom thereof, the outer tube having a downwardly facing material inlet port in the side thereof, said inner tube being movable longitudinally to vary the size of said port; and a valve carried by the inner tube for controlling the volume of air passing therethrough.

3. In apparatus for depositing materials, a feeder comprising a hopper; a tube extending transversely through the hopper near the lower end thereof, said tube having a downwardly facing material inlet port within the hopper and an air intake vent in the end portion of the tube extending from one side of the hopper; and means for admitting air into the end portion of the tube extending from the opposite side of the hopper.

WILLIAM E. ANDERSON.
FRANCIS C. DOWNEY.